April 12, 1955 — F. J. ARCHER — 2,706,098
ANTENNA SUPPORT FOR HOUSE TRAILERS
Filed Jan. 26, 1953
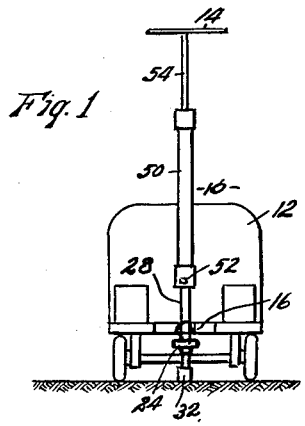
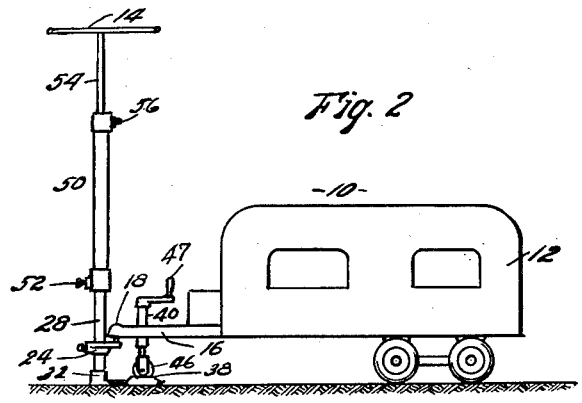
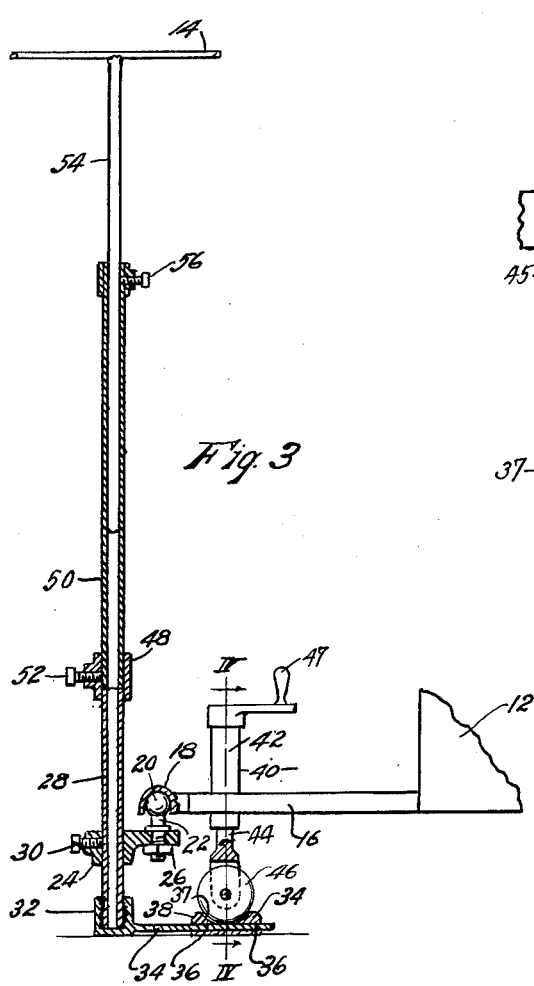
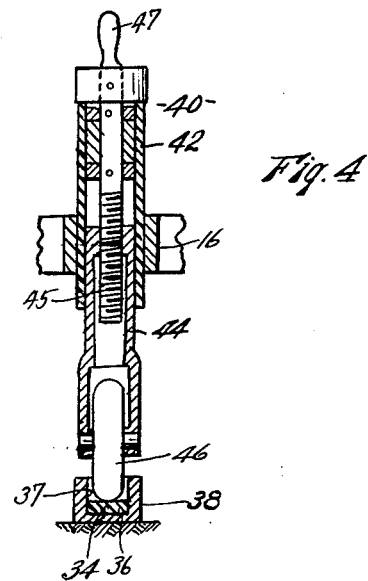
INVENTOR,
Farley J. Archer.
BY Hamilton & Hamilton,
Attorneys.

United States Patent Office 2,706,098
Patented Apr. 12, 1955

2,706,098

ANTENNA SUPPORT FOR HOUSE TRAILERS

Farley J. Archer, Linden, Mo.

Application January 26, 1953, Serial No. 333,279

3 Claims. (Cl. 248—44)

My invention relates to an antenna support for house trailers, and has particular reference to an antenna support which may be rigidly fixed relative to a house trailer without drilling, cutting, riveting, or otherwise using the skin of the trailer body for making the connection. The skin of house trailer bodies is normally made of a light gauge sheet metal, and presents serious problems in attaching antenna supports thereto with connections strong enough to resist the forces of wind and the like against the antenna.

The principal object of the present invention is the provision of an antenna support for use in connection with a house trailer having a front ground engaging support wheel and a downwardly opening socket forming a part of the usual trailer hitch, said antenna support comprising a standard having a base provided with an arm adapted to be fitted into a slot formed through a chock block to receive the weight exerted by said front ground-engaging support wheel whereby said standard is anchored relative to said house trailer, and a member fixed to said standard above said base and engaging said socket.

Other objects of this invention are simplicity and economy of construction, ease and speed of installation, and adaptability for use with any type of antenna or aerial now in general use.

With these objects in view, as well as other objects which will appear in the course of the specification, reference will be had to the drawing, wherein:

Fig. 1 is a front elevational view of a house trailer showing an antenna support embodying the present invention in operative relation thereto.

Fig. 2 is a side elevational view of the structure shown in Fig. 1.

Fig. 3 is a fragmentary enlarged view of the antenna supporting parts similar to Fig. 2, partly in section.

Fig. 4 is an enlarged sectional view of the trailer tongue jack taken on line IV—IV of Fig. 3.

Throughout the several views of the drawing like reference numerals apply to similar parts, and the numeral 10 applies to a house trailer wherein the occupant has installed a television or radio set, which due to the metallic construction of the trailer body 12 requires an outside antenna 14 for proper reception. This house trailer is provided with the usual trailer towing hitch 16, which is provided with a downwardly opening ball receiving socket 18. The ball 20 forming a part of the antenna support is substantially the same as the ball, not shown, which is secured to the automobile drawbar and by means of which the house trailer is drawn while in transit.

Ball 20 has a depending threaded stem 22 which is secured to a bracket 24 by means of a nut 26. This bracket is mounted for longitudinal adjustment on a standard 28 and is adapted to be securely fixed thereto by means of set screw 30. Standard 28 is threaded at its lower end portion and is threaded into a socket base 32. An arm 34 integral with base 32 and extending substantially horizontally therefrom is inserted slidably through slot 36 formed in chock block 38, said block having a concave recess 37 formed in the upper surface thereof. Slot 36 intersects the lower portion of said recess, whereby arm 34 will be engaged within said recess by the front support wheel of the trailer, as hereinafter described. Said arm also possesses a degree of flexibility or resilience, for reasons hereinafter appearing.

The trailer is provided with tongue jack 40 having a housing 42 rigidly fixed to hitch frame 16. This housing carries a vertical jack stem 44 carrying a jack wheel 46 at the lower end thereof, said stem being movable vertically in housing 42 by means of screw 45 and crank 47. Wheel 46 is adapted to rest in chock block 38 to engage arm 34 to anchor standard 28 in a fixed relation to the house trailer 10. It will be noted that the weight of the front end portion of the trailer will rest on arm 34 to prevent its accidental shifting in chock block 38. The resilience of arm 34 permits both base 32 and chock block 38 to rest solidly on the ground even on slightly rough or uneven terrain. This may cause a slight tilting of the standard out of vertical, but this tilting is permitted and compensated for by pivotal movement of ball 20 in socket member 18.

The upper end portion of standard 28 is provided with a collar socket 48 which is adapted to receive the lower end of an extension tube 50 and to secure said tube therein by means of set screw 52. The antenna rod 54 is adjustably mounted in tube 50 and secured in the desired position by means of set screw 56. As shown the antenna may be positioned substantially any desired distance above the top of the house trailer, where it will hold its position without the use of any attachment to the trailer body or of any guy wires.

It is apparent that I have produced an antenna support for house trailers that is easily installed and provides a sturdy structure that will function to position the antenna for proper reception by the television or radio set.

While I have shown and described a specific embodiment of my invention, it is apparent that minor changes of structure and operation could be made without departing from the spirit of the invention as defined by the scope of the appended claims.

What I claim as new and desire to protect by Letters Patent is:

1. An antenna support for use in connection with a house trailer having a front hitch including a downwardly opening socket member and a ground-engaging wheel adjacent said socket, said antenna support comprising a substantnally vertical standard, a ground-engaging base fixed to the lower end of said standard, an arm fixed to and extending horizontally from said base, a chock block having a concave recess in the upper surface thereof and a slot formed horizontally therethrough to intersect the lower portion of said recess, said arm being inserted slidably through said slot and said block being adapted to be inserted between the ground and said trailer wheel, whereby said wheel engages said arm within said recess to prevent movement of said arm in said block, an upwardly projecting knob fixed on said standard and adapted to be engaged in said socket, and means for securing an antenna to said standard.

2, An antenna support for use in connection with a house trailer having a front hitch including a downwardly opening socket member and a ground-engaging wheel adjacent said socket, said antenna support comprising a substantially vertical standard, a ground-engaging base fixed to the lower end of said standard, an arm fixed to and extending horizontally from said base, a chock block having a concave recess in the upper surface thereof and a slot formed horizontally therethrough to intersect the lower portion of said recess, said arm being inserted slidably through said slot and said block being adapted to be inserted between the ground and said trailer wheel, whereby said wheel engages said arm within said recess to prevent movement of said arm in said block, a bracket carried for longitudinal movement along said standard and adjustably fixable thereon, an upwardly projecting knob fixed to said bracket adjacent said standard and adapted to be engaged in said socket, and means for securing an antenna to said standard.

3. An antenna support for use in connection with a house trailer having a front hitch including a downwardly opening spherical socket member and a ground-engaging support wheel adjacent said socket, said antenna support comprising an approximately vertical standard, a ground-engaging base fixed to the lower end of said standard, a flexible arm fixed to and extending substantially horizontally from said base, a chock block having a concave recess in the upper surface thereof and a slot formed horizontally therethrough to intersect the lower portion of said recess, said arm being inserted slidably through said slot and said block being adapted to be inserted between the ground and said trailer wheel, whereby said wheel engages said arm within said recess to prevent movement of said arm in said block, an upwardly projecting spherical knob fixed on said standard and adapted to be engaged in said socket, and means for securing an antenna to said standard.

References Cited in the file of this patent

UNITED STATES PATENTS

| | | |
|---|---|---|
| 350,281 | Wrightsman | Oct. 5, 1886 |
| 541,951 | Slyder | July 2, 1895 |
| 719,268 | Slyder | Jan. 27, 1903 |
| 1,581,325 | Sands | Apr. 20, 1926 |
| 1,747,278 | Zawyruchia | Feb. 18, 1930 |
| 1,887,924 | Evans | Nov. 15, 1932 |
| 2,356,085 | Pfaff, Jr. | Aug. 15, 1944 |
| 2,548,351 | Coombs | Apr. 10, 1951 |
| 2,583,210 | Edwards | Jan. 22, 1952 |

FOREIGN PATENTS

| | | |
|---|---|---|
| 10,152 | Great Britain | May 15, 1905 |